United States Patent Office 3,467,606
Patented Sept. 16, 1969

3,467,606
SEMIFLEXIBLE POLYURETHANE FOAM PREPARED IN ABSENCE OF SURFACTANT
Doris M. Rice, Austin, Tex., assignor to Jefferson Chemical Company, Inc., Houston, Tex., a corporation of Delaware
No Drawing. Filed June 27, 1966, Ser. No. 560,788
Int. Cl. C08g 22/46
U.S. Cl. 260—2.5                                                          9 Claims

ABSTRACT OF THE DISCLOSURE

One-shot semiflexible polyurethane foams are prepared by reacting polyaryl polyisocyanates having functionalities of at least 2.3 with polyether triols having molecular weights of at least 4,500 and high primary hydroxyl content.

---

This invention is concerned with the preparation of one-shot semiflexible polyurethane foams with improved properties. More particularly, this invention is concerned with the preparation of one-shot semiflexible polyurethane foams from polyaryl polyisocyanates having functionalities of at least 2.3 and polyether triols having molecular weights of at least 4,500.

Recently, semiflexible polyurethane foams have gained wide acceptance in the automotive industry in such applications as crash pads, door panels, arm rests and sun visors. Foams for these applications must meet rigid specifications. For example, a specific compression load deflection (CLD) is required for each application. For all of the applications, the foam should have a low compression set, a low loss on humid ageing and the compression set, loss of tensile strength and loss of compressive strength after ageing should be low. Further, the foams should have open cells to prevent shrinkage.

In addition to the above requirements, which apply whether the foam is molded or slab stock, there are additional requirements that must be met when the foam is molded. Many of the molds are of intricate design and will contain thin sections as well as relatively thick sections. In order to completely fill the molds, it is necessary that the foam formulation have good flowability. Formulations must also have long handling times and reasonably fast cure times. The foams are generally poured into vinyl skins that cannot be heated for long periods of time for curing so it is necessary that the curing characteristics of the formulation are such that thin sections of the foam are cured without external heat.

Heretofore, attempts to prepare satisfactory semiflexible foams by a one-shot process have been unsuccessful. I have now discovered a one-shot process for the preparation of semiflexible polyurethane foams meeting all of the above requirements. My process utilizes formulations comprising three major components. These major components are a polyaryl polyisocyanate, a polyether triol and a cross-linking agent, all as defined hereinbelow.

The polyaryl polyisocyanate to be employed in my invention is one having an isocyanate functionality of at least 2.3. The preferred polyaryl polyisocyanates are those having a high degree of para substitution. Especially preferred are crude polyaryl polyisocyanates based on diphenylmethane diisocyanate. Other acceptable isocyanates include, for example, those obtained from the crude aromatic polyamine obtained by condensing aniline with an aldehyde or ketone such as acetone. Similar polyaryl polyisocyanates bearing substituents such as chlorine on the aromatic ring may also be used. A critical upper limit of isocyanate functionality is not known. However, from a practical standpoint, polyaryl polyisocyanates having a functionality greater than about 4 are not readily obtained.

The polyether triol to be used in the invention is one having a molecular weight of at least 4,500 and a primary hydroxyl content of from 20% to 60%, preferably from 40% to 60%. Such a polyether triol is obtained by reacting a trihydric alcohol with a first alkylene oxide having an oxygen to carbon atom ratio of less than 0.4, followed by reaction with ethylene oxide to obtain the desired primary hydroxyl content. Examples of trihydric alcohol initiators include glycerine, trimethylolpropane, trimethylolethane and hexanetriol. The first alkylene oxide having an oxygen to carbon atom ratio of less than 0.4 may be, for example, propylene oxide, 1,2-butylene oxide, or 2,3-butylene oxide. The preferred alkylene oxide for use as the first alkylene oxide is propylene oxide. Ethylene oxide is then added to give a polyether triol having the desired primary hydroxyl content, which for purposes of my invention is from 20% to 60% of the total hydroxyl content. In general, this will require from about 1% to 15% ethylene oxide, based on the weight of the first alkylene oxide employed. Here again the critical upper limit of the molecular weight of the polyether triol is not known. However, from a practical standpoint, a polyether triol having a molecular weight greater than from 6,500 to 7,000 suitable for use in the preparation of polyurethanes is not readily obtainable. Thus, the preferred molecular weight range is 4,500–6,500. Such polyether triols have not heretofore been used in the preparation of polyurethane foams. It is surprising that triols having such high molecular weights can be used in preparing semiflexible foams since past experience has indicated that the degree of flexibility increased with increasing molecular weight of the triol.

The cross-linking agent for use in my invention is a diol or triol having an equivalent weight of less than about 100 and preferably containing a high percentage of primary hydroxyl groups. Many such diols and triols are known to those skilled in the art and include, for example, glycerine, ethylene glycol, propylene glycol, trimethylolpropane, hexanetriol, diethylene glycol and dipropylene glycol. The preferred cross-linking agent is ethylene glycol.

In addition to the above three major components, the foam formulation must also contain water and a catalyst. The water is needed to react with an excess of the isocyanate to generate carbon dioxide for the blowing of the foam. Generally speaking, 1–2 parts by weight of water per 100 parts of triol will be employed. The catalyst is needed to achieve a proper balance of the rates of the chain extension, cross-linking and gas-blowing reactions.

The particular catalyst employed in my formulation is not critical so long as it is one that will give the proper balance of the various reaction rates. This proper balance of reaction rates is necessary for the preparation of any satisfactory polyurethane foam and it is within the skill of one familiar with the art to select a proper catalyst. For example, the catalyst may be a mixture of a tertiary amine and an organotin compound wherein the tin has a valence of four. Examples of suitable tertiary amines include triethylenediamine, methyltriethylenediamine, N,N, N',N'-tetramethyl-1,3-butanediamine and N-ethylmorpholine. Examples of suitable stannic compounds may be found in United States Patents 3,075,927 and 3,084,177. Such compounds include dibutyltin dilaurate, dibutyltin dioctoate, dioctyltin oxide, and dimethyltin diacetate. Another catalyst system that may be employed in my invention is a mixture of lead octoate and N,N'-dimethylpiperazine. Still further catalysts that may be used are the metal alcoholates such as those obtained by reaction of antimony or tin chlorides with glycols.

It is also within the scope of my invention to include inert fillers in the foam formulation. The inclusion of fillers will, in many instances, contribute to an improvement in certain properties, especially tensile strength and tear strength. The inert filler employed may be either an organic or inorganic material. Suitable fillers include carbon black, silica, polyvinyl chloride, barium sulfate and calcium carbonate.

In my formulation, both the high molecular weight polyether triol and the low molecular weight cross-linking agent contribute hydroxyl groups for reaction with the polyisocyanate. In accordance with the usual practice in preparing flexible and semiflexible polyurethane foams, a slight excess of polyisocyanate over that necessary to react with all the available hydroxyl groups should be used. The isocyanate index may usually be within the range of 0.9–1.1 and preferably from 1.0–1.05. The amount of low molecular weight cross-linking agent that may be used is within the range of from 0.5 to 5 weight percent based on the weight of high molecular weight polyether triol employed.

My invention will be further illustrated by the following specific examples:

Example I

A mixture of 300 grams of an ethylene oxide capped propylene oxide adduct of trimethylolpropane having a molecular weight of 5,000 and a primary hydroxyl content of 50%, 4.5 grams of water and 15 grams of a solution of a mixed antimony and tin glycolate catalyst was prepared in a tall waxed drink cup. The catalyst was prepared by reacting 1,280 grams of antimony trichloride and 1,000 ml. of stannic chloride with 1,620 grams of ethylene glycol. This product was then dissolved in 5,000 grams of a polypropylene glycol having a molecular weight of 2,000. The excess ethylene glycol in the catalyst served as the cross-linking agent. To this mixture was added 105 grams of a crude polymethylene polyphenyl isocyanate having a functionality of 2.5 and the mixture was stirred with a propeller-type stirrer for 10 seconds. The foaming mixture was poured into a 12″ x 12″ x 1″ closed aluminum mold preheated to about 110° F. The foam was released from the mold in 15 minutes. The foam had a small even cell structure and good skin. The cells were essentially all open. The following properties of the foam were determined after five days.

Density, p.c.f. _____ 9.1
25%, CLD, p.s.i. (ASTM D–1056) _____ 2.4
50% compression set, percent _____ 13
Loss in 50% CLD after humid ageing 5 hours at 250° F., percent _____ 30

Example II

The procedure in Example I was followed using 275 grams of the high molecular weight polyether triol, 5 grams of water, 20 grams of a solution of a mixed antimony-tin glycolate catalyst and 115 grams of the crude polymethylene polyphenyl isocyanate of Example I. The following properties were obtained on the foam so prepared:

Density, p.c.f. _____ 8.6
25% CLD, p.s.i. _____ 4.2
50% compression set, percent _____ 18.5
Loss in 50% CLD after humid ageing 5 hours at 250° F., percent _____ 25
Elongation, percent _____ 62
Tear, p.l.i. _____ 1.35
Tensile, p.s.i. _____ 21.5

Example III

The following charges were employed to prepare foam by the procedure outlined in Example I: 240 grams of the polyether trial of Example I, 5 grams of water, 20 grams of the catalyst of Example II, 110 grams of the polyisocyanate of Example I, and 48 grams of carbon black. The following properties were obtained on the foam so prepared:

Density, p.c.f. _____ 8.5
25% CLD, p.s.i. _____ 6.0
Compression set, 50%, percent _____ 12.4
Loss in 50% CLD after humid ageing 5 hours at 250° F., percent _____ 20.0
Elongation, percent _____ 75
Tear, p.l.i. _____ 1.79
Tensile, p.s.i. _____ 31.2

Example IV

A mixture of 180 grams of an ethlyene oxide capped propylene oxide adduct of trimethylolpropane having a molecular weight of 6,500 and containing 50% primary hydroxyl groups, 3.6 grams of water, 20 grams of the catalyst used in Example I, and 90 grams of silica was prepared in a tall waxed drink cup. To the mixture was added 77 grams of the polyisocyanate of Example I and the mixture was stirred with a propeller-type stirrer turning at 2,200 r.p.m. for 10 seconds. The foaming mixture was then poured into a 12″ long aluminum mold whose cross-section roughly resembled an automobile crash pad. In filling the mold the foaming mass had to rise 8″ into a narrow section that came to a point at the top. The foam filled this mold completely and contained no large voids. No shrinkage of the foam was evident. The foam cured without difficulty.

Example V

A foam was prepared by the procedure outlined in Example I using 240 grams of the polyether triol of Example I, 5 grams of water, 5 grams of a 24% solution of lead octoate, 1 gram of dimethylpiperazine, 4 grams of ethylene glycol, 48 grams of carbon black and 110 grams of the polyisocyanate of Example I. The foam had the following properties:

Density, p.c.f. _____ 8.0
25% CLD, p.s.i. _____ 5.0
50% compression set, percent _____ 12
Loss in 50% CLD on humid ageing 5 hours at 250° F., percent _____ 22

Example VI

The procedure of Example I was followed in preparing a foam from 275 grams of the polyether triol of Example I, 5 grams of water, 7 grams of an antimony glycolate prepared from 456 grams of antimony trichloride and 268 grams of ethylene glycol, and 115 grams of the polyisocyanate of Example I. The molded foam had a small even cell structure with a smooth skin. The cells were very easily opened. The foam had the following properties:

Density, p.c.f. _____ 8.2
25% CLD, p.s.i. _____ 3.8
50% compression set, percent _____ 12.6
Loss in 50% CLD on humid ageing 5 hours at 250° F., percent _____ 10.3

The following examples illustrate the necessity of adhering to my formulation in order to obtain satisfactory one-shot molded semiflexible polyurethane foams.

Example VII

A foam was prepared using exactly the same procedure and charges as in Example V, with the exception that carbon black and ethylene glycol were not added to the formulation. This foam was slower to cure and had much larger cells than that of Example V. Because of the slow cure, it would not be satisfactory in preparing molded foams, particularly those having thin sections.

Example VIII

The procedure of Example I was used in preparing a foam from 275 grams of an ethylene oxide capped propylene oxide adduct of trimethylolpropane having a molecular weight of only 3,000 and containing 50% primary hydroxyl groups, 5 grams of water, 124 grams of the polyisocyanate of Example I and 7 grams of the catalyst of Example VI. The foam so prepared built up considerable mold pressure and the cells were very difficult to break. This closed cell structure would lead to shrinkage of the foam.

Having thus described my invention, I claim:

1. A semiflexible polyurethane foam having open cell structure comprising the one-shot reaction product of (a) a polyaryl polyisocyanate having a functionality of at least 2.3; (b) a diol cross-linking agent having an equivalent weight of less than about 100; and (c) a polyether triol having a molecular weight of at least 4,500 to about 7,000 and a primary hydroxyl content of about 20% to about 60% wherein the reaction occurs in the presence of water and a catalyst in absence of a surfactant.

2. The polyurethane foam of claim 1 wherein the polyaryl polyisocyanate is a crude polymethylene polyphenyl isocyanate.

3. The polyurethane foam of claim 2 wherein the primary hydroxyl content of the ethylene oxide capped polyether triol is 40% to 60%.

4. The polyurethane foam of claim 1 wherein an inert filler is included in the formulation.

5. The polyurethane foam of claim 1 wherein the cross-linking agent is ethylene glycol.

6. The polyurethane foam of claim 1 wherein the molecular weight of the polyether triol is within the range of 4,500–6,500.

7. The semiflexible polyurethane foam of claim 1 wherein the triol has a molecular weight within the range of 4,500 to about 6,500 and a primary hydroxyl content of from 40% to 60%.

8. The method of producing a molded semiflexible polyurethane foam crash pad having open cell structure comprising the steps of mixing together a polyether triol having a molecular weight within the range of 4,500 to about 6,500 and a primary hydroxyl content of between 40% to 60%, 0.5 to about 5 parts per 100 parts of the triol of a diol cross-linking agent having an equivalent weight of less than about 100, a catalytic amount of a catalyst, an inert filler and one to about two parts water per 100 parts of the triol; adding to the mixture and mixing therewith a polyaryl polyisocyanate having a functionality of at least 2.3 in an amount to give an isocyanate index from 0.9 to about 1.1; pouring the latter mixture into a mold; and removing the mold after a sufficient time has passed to cure the semiflexible polyurethane foams whereby a molded semiflexible polyurethane foam crash pad substantially free of large voids is formed wherein said method is performed in absence of a surfactant.

9. A molded semiflexible polyurethane foam crash pad produced by the process of claim 8.

References Cited

UNITED STATES PATENTS 3,328,320  6/1967  Lord _____ 260—2.5

FOREIGN PATENTS 967,441  8/1964  Great Britain.
974,169  11/1964  Great Britain.
665,495  6/1963  Canada.

DONALD E. CZAJA, Primary Examiner

M. B. FEIN, Assistant Examiner

U.S. Cl. X.R.

180—82; 264—54